July 17, 1956  H. H. MOULDER  2,755,035
COMBINED HOSE REEL AND SPRINKLER
Filed May 14, 1954  2 Sheets-Sheet 1

INVENTOR
HARRY H. MOULDER
BY
Frederick E. Bromley
ATTY.

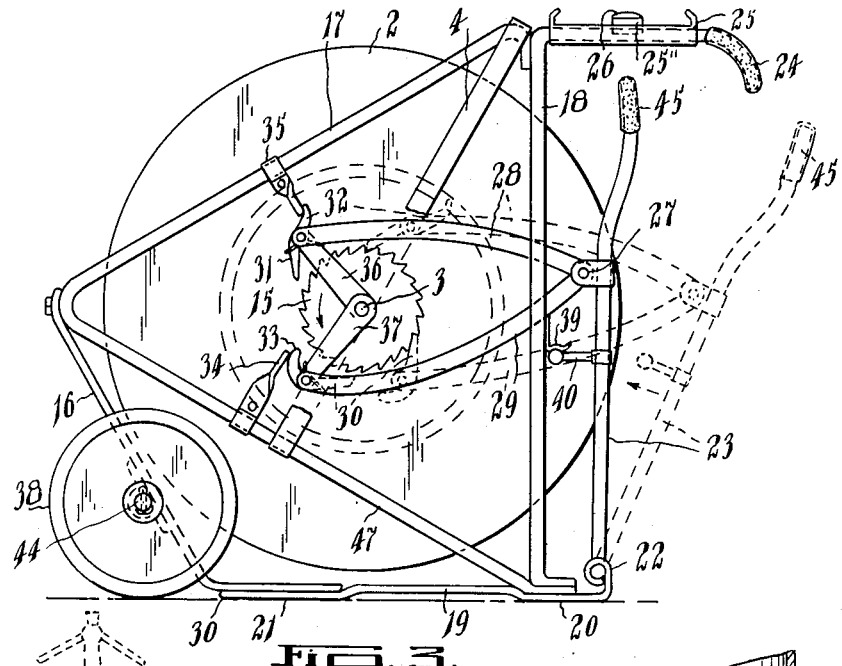
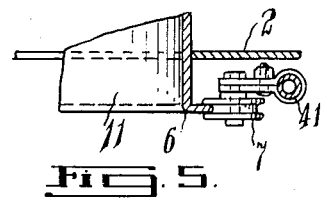
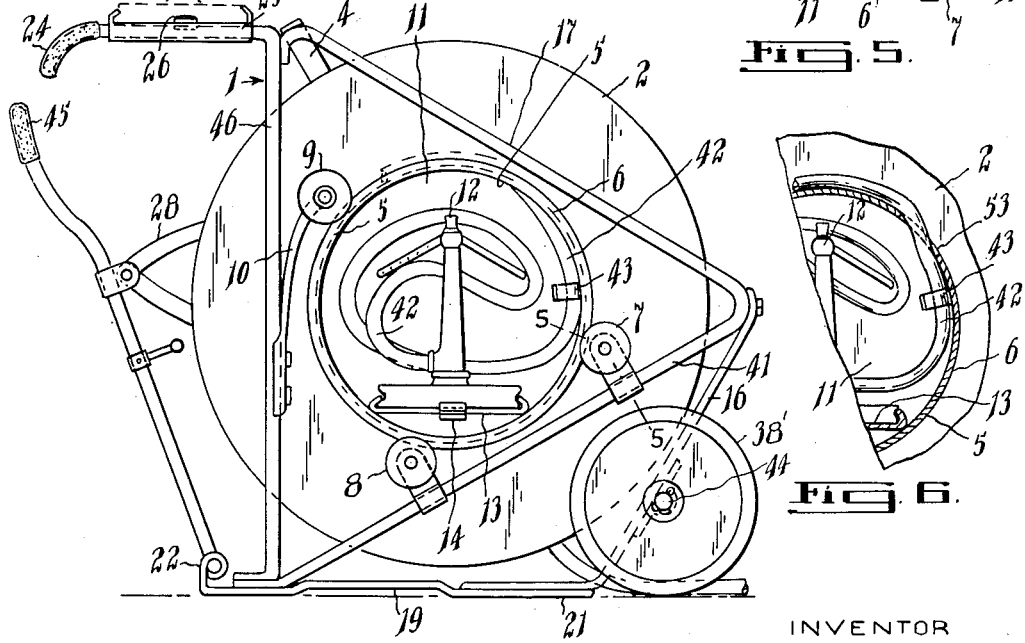

United States Patent Office 2,755,035
Patented July 17, 1956

2,755,035

COMBINED HOSE REEL AND SPRINKLER

Harry H. Moulder, Fruitland, Ontario, Canada

Application May 14, 1954, Serial No. 429,876

4 Claims. (Cl. 242—87)

This invention relates to portable hose reel and sprinkler arrangements.

It is known to provide a reel having a wheeled framework and containing a drum upon which a length of hose piping can be coiled for storage.

It is also known to provide such a reel with a central hose connector whereby the hose can be reeled or unreeled without disconnecting an end thereof from the water connection.

Prior art arrangements of the kind mentioned suffer from the disadvantage that the reel must be kept close to the water tap and one must operate from the tap as a base when changing the extended length of a hose line whereas it would be more practical if one could operate the reel from the discharge end of the hose which must be frequently repositioned in order to "pattern-water" a garden as is the practice. In the past there has been a temptation to merely reposition the discharge head of the hose without reeling-in and as a result the hose adopts circuitous attitudes, often being dragged across delicate plants which are thereby damaged.

It is a feature of this invention to provide a hose reel and sprinkler arrangement which, while it may if desired be permanently connected to a fixed water outlet, it is capable of being moved while unreeling the hose line to a desired position, the hose discharge fixture being always on the reel support no matter how much hose may be played out. Also the arrangement contemplated can be repositioned at an adjacent or specified pattern area and the hose may at the same time be reeled in so as to have only the minimum length necessary of unreeled hose line spanning the distance between the fixed water outlet and the discharge nozzle of the system.

It is a further object to provide a hose reel and sprinkler arrangement wherein there are no water carrying spindles or water-coupling devices associated with the reel mechanism itself, the only breaks in the hose continuity between intake and discharge being the normal terminal couplings commonly used to join lengths of hose and to connect hose lines to intake and discharge agencies.

A still further object is to provide a hose reel of the kind mentioned wherein facilities are incorporated for reeling-in the hose line while the reel is being rolled along the ground in a direction different to that which would tend to unreel the hose line.

The invention also contemplates means which can be incorporated in the construction of the reel for storing a spray device and also further means for mounting the latter upon the framework of the reel so that the assembly functions as a supporting stand for the spraying agent while it is in operating attitude.

According to the present invention there is provided a hose reel appliance comprising a hose reel mounted upon a wheeled frame in the form of a cart having a handle and in which a hose of suitable length is coiled on the reel and permanently connected at its inner end to an ordinary sprinkler. The sprinkler is normally supported within the core or drum portion of the reel which is open at an end for insertion and removal of the sprinkler. The inner end of the hose extends through the core or drum portion of the reel to enable the connection to be made with the sprinkler. The hose near its inner end is fastened to the reel with a stretch of a length to permit the sprinkler to be removed and placed on the seat on the cart for a sprinkling operation.

In this arrangement the appliance can be wheeled to a tap and the outer end of the hose can be connected to the same, whereupon the appliance may be wheeled to the "spot" at which it is desired to locate the sprinkler for hosing a lawn or flower bed, etc. This is readily carried out by removing the sprinkler from the interior of the reel and attaching it on the cart seat which is elevated to spray from an overhead position. When an area has been sprayed the appliance can be readily shifted to another area by shutting off the tap and wheeling the appliance to the fresh location without disturbing the sprinkler. The water is then turned on to continue the spraying operation. The appliance may be shifted as often as required and when its use is to be discontinued the water is shut off and the appliance is wheeled toward the tap and the hose is wound on the reel manually by moving a hand lever to and fro which in turn operates a ratchet device in a winding operation. A one-way ratchet device is employed and supplied with means for disconnecting the hand lever and for allowing the reel to turn in a paying out direction when required. The hose is, of course, detached from the tap for storage of the appliance.

To provide a construction which accomplishes the above objects a hose reel and sprinkler arrangement according to my invention comprises a wheeled trolley, a hose reel having at one end an integrally fitted axial spindle and at its other end a flanged drum mounted rigidly in co-axial relation therewith, a fixed spindle bearing positioned upon one side of said trolley supporting the said axial spindle, a resilient bearing assembly on the other side of said trolley positioned to engage the said flanged drum and in cooperation with said spindle and spindle bearing to support the said reel in a substantially horizontal attitude upon said trolley, means for selectively rotating said reel about its axis, and means for detachably nesting a sprinkler head and attached hose outlet terminal fitting within the said flanged drum.

The novel structure includes means for detachably mounting and storing within the said drum a sprinkler and a portion of the said hose outlet terminal, and means attached to a portion of the trolley frame for detachably mounting the said sprinkler head in an operating attitude while still connected to the said hose outlet terminal.

In order to facilitate the reeling-in of the hose when the trolley is moving in a direction other than away from the hose intake point, I provide a ratchet wheel positioned upon the said spindle and a hand operated pawl device supported upon the said trolley frame and co-operating with said ratchet wheel to rotate the reel in a specified direction.

The structure further includes a release mechanism whereby the pawl arrangement may be disengaged in order that the reel may free-wheel when the trolley is moved away from the hose intake point.

The invention will now be more particularly disclosed by the following description of a preferred example of construction in accordance therewith. Reference will be made to the accompanying drawings wherein:

Fig. 3 depicts the construction of Fig. 2 with the pawl device disabled for free-wheeling of the reel.

Fig. 4 depicts the construction of Fig. 1 viewed from the other side and shows details of a reel drum and bearing assembly and a fixture for nesting the sprinkler and hose outlet end within the drum portion of the reel.

Fig. 5 is a fragmentary sectional detail of the bearing arrangement for supporting the reel. This view is taken substantially on line 5—5 of Fig. 5.

Fig. 6 is a fragmentary sectional view of the reel showing the outlet end of the hose passing through the drum of the reel into the interior thereof.

Figure 1:
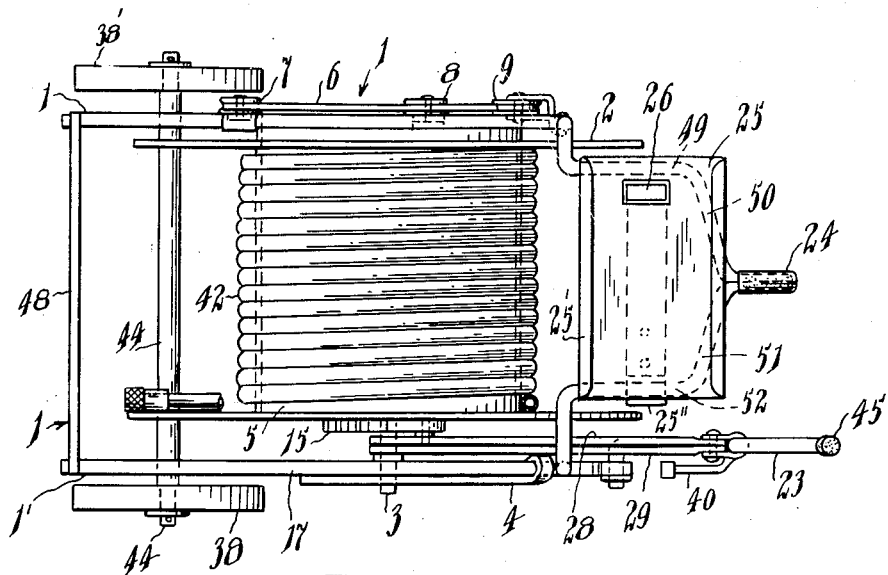
Fig. 1 is a top plan view depicting trolley and reel arrangement in accordance with the invention.

Referring now to these figures, a framework of metal rod and strap material forms a cart or trolley 1. The cart frame includes two similar side members 1' connected by cross bars. 2 is a hose reel mounted horizontally upon the cart 1 by means of the side members 1' thereof. One end of the reel terminates in a stub spindle 3 supported within a bearing hole in frame member 4. Said reel includes a drum 5 open at the end opposite the spindle 3. Drum 5 is set in co-axial attitude with respect to spindle 3 and is journalled at its open end. The reel flanges project radially of the drum element and at the open end of the drum there is ring 6 engaged by grooved rollers, which are mounted on frame members 41 and 46 of the cart body 1. Desirably there are three rollers designated at 7, 8, 9. Roller 9 is preferably resiliently attached to frame member 46 by a springy member 10 so as to take up an incidental slack and allow for tolerance in drum concentricity.

The drum 5 includes a cavity 11 and this is made deep enough to accommodate a conventional sprayer 12 of the stand type and a short length of the hose 42. The spraying head 12 can be seated on a platform 13 and is secured on the seat by spring latch 14 when it is desired to store the sprayer during periods of disuse or when moving the trolley cart from one location to another. A platform 25, similar to 13, is attached to the upper portion of frame 1 and is provided with a latch 26 (similar to 14). When the trolley has been positioned in the area to be sprayed, the sprayer 12 is removed from the nesting attitude in the reel-drum 5 and is latched in position on platform 25 where it is in operating attitude.

The framework 1 may comprise two similar triangular sections of metal rod or the like, of which the section at the spindle side of the reel comprises the elements 17, 18, 47. On each lower part of a frame section a flat strip material forms a wheel axle support 16 and a bottom runner 19 having two lands 21, 20 which rest on the ground when the reel cart is at rest. The member 20 on one side is curled at its distal end to form a bearing 22 for a hand lever 23 whose special purpose will be disclosed later.

A cross brace 48 rigidly connects the wheeled end of the frame 1, and the rear part of the cart is strengthened by turning the members 18, 46 inward, then backward, and finally joining them at handle 24. The resulting frame configuration having the arms 49, 50, 51, 52, provides also an appropriate support for the platform 25. The sprinkler 12 may be retained on the platform or seat 25. One way of achieving this is to provide inturned lips 25' on the seat at opposite sides between which the base of the sprinkler is placed by sliding it therein. The base of the sprinkler may abut an end stop 25" and be secured by the latch 26 aforesaid. The seat or platform 13 in the reel is similarly constructed.

Figure 2:
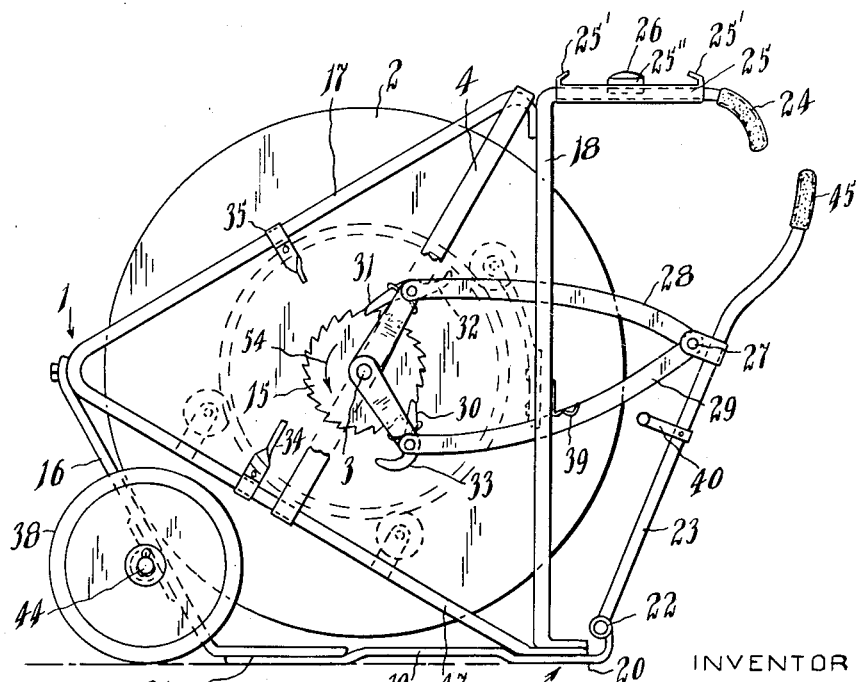
Fig. 2 depicts the construction of Fig. 1 in a side view and showing a ratchet and pawl device for restraining and rotating the hose reel.

When the reel cart is being trundled outwardly from the tap and paying out the hose line behind it, the reel 2 is allowed to free-wheel so that the hose can unwind off the reel readily. The handle 24 is used to move the cart and during movement is raised off the lands 20, 21 of the stand. It will be noted that the hose is wound onto the reel in the opposite phase to prior art habits of operation. That is, the outlet end of the hose is captive to the core or drum of the reel. Figure 6 shows the outlet portion of the hose 42 passing through an aperture 53 in drum 5 and fastened to the inside of the drum by a clamp 43. When the hose is reeled up, the hydrant end is on the outside of the coil and is payed out from the under side of the reel, near ground level. The hose is wound on the drum so that when the reel is pulled away from the hydrant connection the drum turns in the direction of travel of the trolley. On the reverse motion or when moving the trolley to a position generally to shorten the direct line distance between the trolley and the hydrant, it is desirable to reel-in the hose in such a manner that it does not get caught on plants or vegetables, bushes or the like in the garden area being watered. To this end I provide means for rotating the reel so as to reel in a specified amount of hose when desired. I have also arranged this means so that it functions, when required, as a brake or as a lock. In a further aspect the rotating means may be readily disabled so that the reel may free wheel when required. This means comprises a ratchet wheel 15 having one-way teeth designed to be engaged by pawls 30 and 31. Wheel 15 is captive to spindle 3 and to reel 2. The hand lever 23 is attached to connecting rods 28, 29 at 27 and these rods 28, 29 are in turn pivoted to the outer ends of respective radial arms 36, 37 whose inner ends are journalled in side by side relation upon spindle 3. Also pivoted at the outer ends of the rods 28, 29 are pawls 30, 31, and each pawl has a rearward extension 32 and 33. The extensions 32 and 33 provide means for levering the pawls out of engagement with the ratchet when it is desired that the reel be free to turn for paying out the hose. This arrangement is defined herein as a ratchet device and functions as follows. When the lever 23 is drawn backward as shown dotted in Figure 3 (solid, in Figure 2) the pawl 30 engages teeth of ratchet wheel 15 and turns it in the direction of the arrow. At the same time pawl 31 is drawn clockwise over the teeth and at the end of the stroke engages a tooth on ratchet wheel 15 so that when the lever is pushed forward (toward the reel) pawl 31 drives the ratchet wheel also in the direction of the arrow. Wherever the lever is, over a specified range of movement back and forth, one or other of the pawls is in mesh with the teeth and prevents the reel from rotating in any direction other than that shown by the arrows in Figures 2, 3. Since the normal tendency of motion of the reel will be to unwind, that is to turn against the arrow 54, pawls when engaged act either as a brake or as a driving force to wind up the reel depending upon whether the lever 23 is stationary or in motion, over its active normal range of oscillation. When the lever 23 is pressed forward so that the latch-bar 40 is engaged with latch clip 39 to lock the lever in a neutral attitude, the pawl trip elements 32, 33 engage the stops 34, 35 respectively whereby the pawls 30, 31 are pushed away from the teeth of ratchet 15 so that the reel may free-wheel in either direction as long as the lever 23 is in its latched position. When it is desired to reel-in hose, one need merely pull on hand grip 45 to draw the lever 23 away from its latch and then by simply pumping the lever 23 back and forth over a specified range of movement clear of the latch clip 39 the hose can be reeled in upon the reel drum to whatever length is desired. If only a few turns of the reel are needed to reposition the hose line and sprayer, the latter may be left in its spraying attitude on seat 25. However, if any considerable number of turns of the reel are contemplated, it is expedient to return the spraying head 12 to its nested attitude within drum recess 11 so as to avoid undue twisting of the outlet end of hose 42.

The wheels 38, 38' may have a free movement about an axle 44 and will, of course, be fitted with resilient tires. The wheels 38, 38' should be of a diameter small enough to allow the lands 20, 21 to rest firmly on a flat surface but not small enough to require the frame to be tipped upward by any large angle in order to wheel the reel along the ground.

If desired the hose portion 42 may be connected to the main reeled hose line by a coupling rigidly inserted in the core of the reel. In the illustrated embodiment the portion 42 is shown as an integral part of the main hose line which is passed through the aperture 53, Fig. 5.

Various modifications as to the shape of the frame size and depth of drum, width of reel and the like can be made without departing from the spirit of the invention as broadly defined by the appended claims. It is further not intended that the claims should be limited to the particular pawl actuating means described as a means for rotating the reel.

What is claimed is:

1. In an appliance of the class described, a handled cart, a hose reel journalled therein, a hose captive at an end to said reel for winding and unwinding operations, a hand lever fulcrumed on said cart, and a ratchet mechanism for translating oscillatory motion of said lever into a rotary movement of said reel in a winding direction, said ratchet mechanism comprising a ratchet wheel co-axial with said reel and movable therewith, a pair of radial arms pivotally supported at the axis of the reel to extend radially at diametrically opposite sides of the ratchet wheel, connecting rods having pivotal connection with said hand lever and said radial arms at points removed from the respective axes thereof, and biased pawls carried by said radial arms and engaged with said ratchet wheel.

2. A hose reel device comprising a trolley, a hose reel journalled on said trolley by supporting means including an axial spindle, and manual means for selectively coiling and uncoiling a hose line upon said reel by turning said reel in a winding or unwinding direction, said manual means comprising a ratchet wheel mounted on said axial spindle to turn with said reel as a unit, a pair of rocker arms journalled at one end upon said spindle and extending radially beyond the periphery of the said wheel, on each of the outer ends of said rocker arms a pawl pivotally journalled freely thereat, a pair of drive rods each journalled at an inner end concentrically with the pivotal point of a said pawl, a second order lever having its fulcrum journalled upon a lower portion of said trolley, and its selected resistance point fitted with a clip and cross pin to form a bearing spindle receiving jointly in journalled relation the two outer ends of said drive rods, the pawls being so devised that when the lever is moved toward the axis of said reel one pawl will engage the ratchet wheel to drive the reel in a specified direction and when the lever is moved away from the axis of the reel the first pawl will slip backward over the teeth and the second pawl will engage the ratchet wheel and turn the reel in the same specified direction, a pair of bumpers mounted upon the trolley and positioned in such an attitude with respect to said pawls that when the said lever is moved inwardly beyond a specified limit, the bumpers disengage both pawls from the teeth of said ratchet so that the reel is enabled to freewheel, and means for locking the lever in the last mentioned attitude.

3. In an appliance of the class described, a handled cart, a hose reel journalled therein, a hose captive at an end to said reel for winding and unwinding operations, a hand lever fulcrumed on said cart, and a ratchet mechanism for translating oscillatory motion of said lever into a rotary movement of said reel in a winding direction, said ratchet mechanism comprising a ratchet wheel co-axial with said reel and movable therewith, a pair of radial arms pivotally supported at the axis of the reel to extend radially at diametrically opposite sides of the ratchet wheel, connecting rods having pivotal connection with said hand lever and said radial arms at points removed from the respective axes thereof, biased pawls carried by said arms and engaged with said ratchet wheel, latching means for releasably retaining the hand lever in an extreme position to which it may move in one stroke of an oscillatory movement, and means for disengaging said pawls from the ratchet wheel as said hand lever is moved to said extreme position.

4. A combination as set forth in claim 3, in which the pawl disengaging means comprises extensions on the pawls engageable with fixed stops on the cart.

References Cited in the file of this patent

UNITED STATES PATENTS

| 1,714,713 | Farley | May 28, 1929 |
| 2,313,557 | Krenke | Mar. 9, 1943 |
| 2,361,494 | Peter | Oct. 31, 1944 |
| 2,490,736 | McGarry | Dec. 6, 1949 |
| 2,518,990 | Keener | Aug. 15, 1950 |

FOREIGN PATENTS

| 107,969 | Switzerland | Apr. 1, 1925 |